United States Patent
Sakakibara

(10) Patent No.: US 8,386,172 B2
(45) Date of Patent: Feb. 26, 2013

(54) IN-VEHICLE APPARATUS AND MAP DATA UPDATING SYSTEM

(75) Inventor: Hiroaki Sakakibara, Nisshin (JP)

(73) Assignee: DENSO CORPORATION, Kariya-city (JP)

( * ) Notice: Subject to any disclaimer, the term of this patent is extended or adjusted under 35 U.S.C. 154(b) by 438 days.

(21) Appl. No.: 12/656,852

(22) Filed: Feb. 18, 2010

(65) Prior Publication Data

US 2010/0228470 A1    Sep. 9, 2010

(30) Foreign Application Priority Data

Mar. 4, 2009 (JP) .................................. 2009-51260

(51) Int. Cl.
*G01C 21/00* (2006.01)

(52) U.S. Cl. ........ 701/450; 701/400; 701/409; 701/446; 701/448; 701/451; 701/461; 701/540

(58) Field of Classification Search .................. 701/400, 701/409, 444, 446, 448, 450, 451, 461, 540
See application file for complete search history.

(56) References Cited

U.S. PATENT DOCUMENTS

| | | | | |
|---|---|---|---|---|
| 5,689,252 | A * | 11/1997 | Ayanoglu et al. ............. | 340/991 |
| 5,774,824 | A * | 6/1998 | Streit et al. ..................... | 701/446 |
| 6,400,690 | B1 * | 6/2002 | Liu et al. ........................ | 370/252 |
| 7,292,937 | B2 * | 11/2007 | Kuroda et al. ................ | 701/461 |
| 7,831,389 | B2 * | 11/2010 | Yamada ......................... | 701/412 |
| 7,930,099 | B2 * | 4/2011 | Iwahori ......................... | 701/450 |
| 7,953,528 | B2 * | 5/2011 | Oesterling et al. ............ | 701/29.3 |
| 2002/0029108 | A1 * | 3/2002 | Liu et al. ........................ | 701/208 |
| 2002/0161519 | A1 * | 10/2002 | Mori et al. .................... | 701/210 |
| 2003/0018428 | A1 * | 1/2003 | Knockeart et al. ............ | 701/210 |
| 2003/0055553 | A1 * | 3/2003 | Knockeart et al. ............ | 701/120 |
| 2003/0055555 | A1 * | 3/2003 | Knockeart et al. ............ | 701/202 |
| 2006/0173613 | A1 * | 8/2006 | Iwahori ......................... | 701/208 |
| 2006/0271282 | A1 * | 11/2006 | Kuroda et al. ................ | 701/208 |
| 2008/0162041 | A1 * | 7/2008 | Nakamura .................... | 701/209 |

FOREIGN PATENT DOCUMENTS

| | | |
|---|---|---|
| JP | A-2003-296884 | 10/2003 |
| JP | A-2004-085405 | 3/2004 |
| JP | A-2005-147864 | 6/2005 |
| JP | A-2007-046962 | 2/2007 |
| JP | A-2007-064951 | 3/2007 |
| JP | A-2007-065042 | 3/2007 |
| JP | A-2007-087069 | 4/2007 |
| JP | A-2007-093260 | 4/2007 |
| JP | A-2004-212244 | 7/2007 |
| JP | A-2007-248425 | 9/2007 |

* cited by examiner

*Primary Examiner* — Khoi Tran
*Assistant Examiner* — Jorge Peche
(74) *Attorney, Agent, or Firm* — Posz Law Group, PLC

(57) ABSTRACT

An in-vehicle apparatus includes: a memory for storing a map data; a center communication element for obtaining a latest map data from a center; an inter-vehicle communication element for communicating with another in-vehicle apparatus; an input element for receiving an input signal of a specific area from an user; and a controller for setting the specific area as an initial main area. The inter-vehicle communication element receives another map data from another in-vehicle apparatus. The controller compares the map data with another map data. When another main area includes an area not included in the initial main area, the controller adds the area as a new main area, and updates the map data with another map data. The controller updates the map data corresponding to the initial main area with the latest map data.

6 Claims, 5 Drawing Sheets

IN-VEHICLE APPARATUS AND MAP DATA UPDATING SYSTEM

CROSS REFERENCE TO RELATED APPLICATION

This application is based on Japanese Patent Application No. 2009-51260 filed on Mar. 4, 2009, the disclosure of which is incorporated herein by reference.

FIELD OF THE INVENTION

The present invention relates to an in-vehicle apparatus for updating map data and a map data updating system.

BACKGROUND OF THE INVENTION

Conventionally, a navigation apparatus guides a route to a predetermined destination and displays a map of any area. In the navigation apparatus, map data is read out from a memory medium such as a CD-ROM, a DVD-ROM and a HDD, and route setting and map display are performed. Here, an actual road may be changed or newly built. Thus, the map data preliminary stored in the memory medium does not include new map data for a portion in which the road is changed or newly built.

In view of the above point, for example, the new map data in each area is obtained from a control center for controlling the map data via a communication network and updated. Another method is disclosed in JP-A-2003-296884, JP-A-2004-85405 and JP-A-2007-93260 such that the new map data in each area is obtained from another navigation apparatus in another vehicle via an inter-vehicle communication system and updated.

When all of the map data in all of area is obtained and updated, a communication cost increases, or load of the control center increases. Thus, it is practical to obtain and update a part of the map data for a part of an area. An apparatus for updating only a part of the map data is disclosed in, for example, JP-A-2007-64951. In this apparatus, latest map data corresponding to old map data is obtained via the inter-vehicle communication system, and the latest map data is stored in the apparatus. Further, in JP-A-2007-65042, a deficient part of the map data for showing a map around a current position of the vehicle is firstly obtained via the inter-vehicle communication system, and the map data is updated. In JP-A-2005-147864, the latest map data corresponding an area including the same type of a POI (point of interest) as a POI of an area through which the vehicle has passed in the past, a POI of the destination and a POI of a point on the route to the destination is obtained via the inter-vehicle communication system, and the map data is updated.

However, in the techniques described in JP-A-2007-64951, JP-A-2007-65042 and JP-A-2005-147864, a part of the map data corresponding to a part of an area is updated, so that a communication cost is reduced, and a load of the center is reduced. However, the map data corresponding to a comparatively large area is not effectively updated.

Specifically, in the navigation apparatus disclosed in JP-A-2007-64951, only a part of the map data corresponding to an area including a route, which has been searched, is updated. Thus, other part of the map data corresponding to an area not including a route, which has been searched, is not updated.

In a map data updating system disclosed in JP-A-2007-65042, a part of the map data corresponding to an area around the vehicle among the deficient part of the map data is updated preferentially. Thus, other part of the map data corresponding to an area other than the area around the vehicle is not updated easily.

In a method for updating map data disclosed in JP-A-2005-147864, only the latest map data corresponding an area including the same type of the POI as the POI of an area through which the vehicle has passed in the past, a POI of the destination and a POI of a point on the route to the destination is updated. Thus, only the map data corresponding to a certain area is updated.

SUMMARY OF THE INVENTION

In view of the above-described problem, it is an object of the present disclosure to provide an in-vehicle apparatus for updating map data. It is another object of the present disclosure to provide a map data updating system.

According to a first aspect of the present disclosure, an in-vehicle apparatus for updating a map data mounted on a vehicle includes: a memory for storing the map data, which is defined in each area; a center communication element for obtaining a latest map data from an external information center via a communication network; an inter-vehicle communication element for transmitting data to and receiving data from another in-vehicle apparatus mounted on another vehicle with an inter-vehicle communication method; an input element for receiving an input signal from an user, the input signal specifying a specific area; and a controller for setting the specific area as an initial main area. The inter-vehicle communication element receives another map data corresponding to another main area set in another controller of another in-vehicle apparatus. The controller compares the map data corresponding to the initial main area with another map data. When the controller determines that another main area includes an area, which is not included in the initial main area, the controller adds the area as a new main area into the initial main area, and the controller updates the map data with another map data corresponding to the new main area. The controller updates the map data corresponding to the initial main area with the latest map data from the external information center.

In the above apparatus, since only another map data corresponding to another main area set in another in-vehicle apparatus is obtained via the inter-vehicle communication, communication volume of the inter-vehicle communication is reduced, and communication load is also reduced. Further, whenever the controller updates the map data with another map data corresponding to the new main area, the initial main area increases, and therefore, the map data corresponding to a wide area is updated. Furthermore, since another map data corresponding to the new main area, which is to be updated, is not excessively limited to tendency of the user, the map data of a large area is updated. Further, since the controller updates the map data corresponding to the initial main area with the latest map data from the external information center, a range of the latest map data is limited to the initial main area, and therefore, a communication cost is reduced. Further, a load of the information center is reduced. Thus, the map data is effectively updated with widening a range of the map data to be updated appropriately, and the map data corresponding to a large area is effectively updated.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
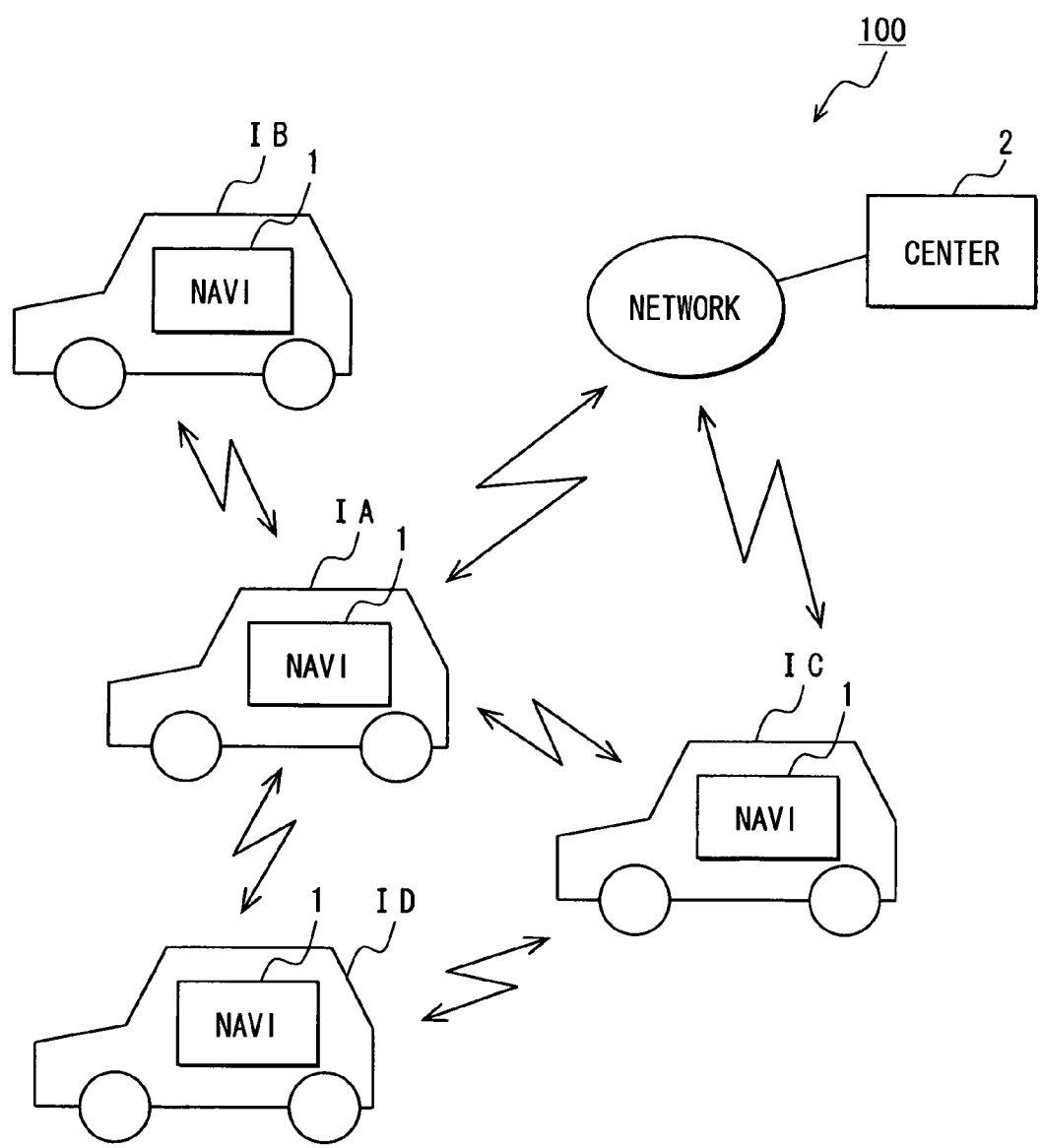
FIG. 1 is a block diagram showing a map data updating system according to an example embodiment.

FIG. 1 shows a map data updating system 100 according to an example embodiment. The system 100 includes multiple navigation apparatuses 1 mounted on multiple vehicles IA-ID and a control center 2.

The center 2 includes a server having a communication device, a memory device and a control device. The communication device communicates with each navigation apparatus 1 of the vehicle IA-ID via a network (i.e., a communication network). The memory device functions as a map database and stores all of map data, which is capable of being updated. The control device controls communication with the navigation apparatus 1. The center 2 may include only one server. Alternatively, the center 2 may include multiple servers. The memory device in the center 2 stores the latest map data even when the road is changed, and/or a new road is constructed so that the map data is changed. The detail of the map data will be explained as follows.

The navigation apparatus 1 is mounted on a vehicle such as an automotive vehicle. The apparatus 1 is mounted on each automotive vehicle IA-ID. The apparatus 1 functions as a general navigation device so that the apparatus 1 guides a route. Further, the apparatus 1 communicates with the center 2 via the network. Furthermore, the apparatus 1 communicates with another navigation apparatus 1 mounted on another vehicle.

In FIG. 1, the system 100 includes four navigation apparatuses 1 mounted on four vehicles IA-ID. Alternatively, the system 100 may include two or more apparatuses 1 on two or more vehicles.

Figure 2:
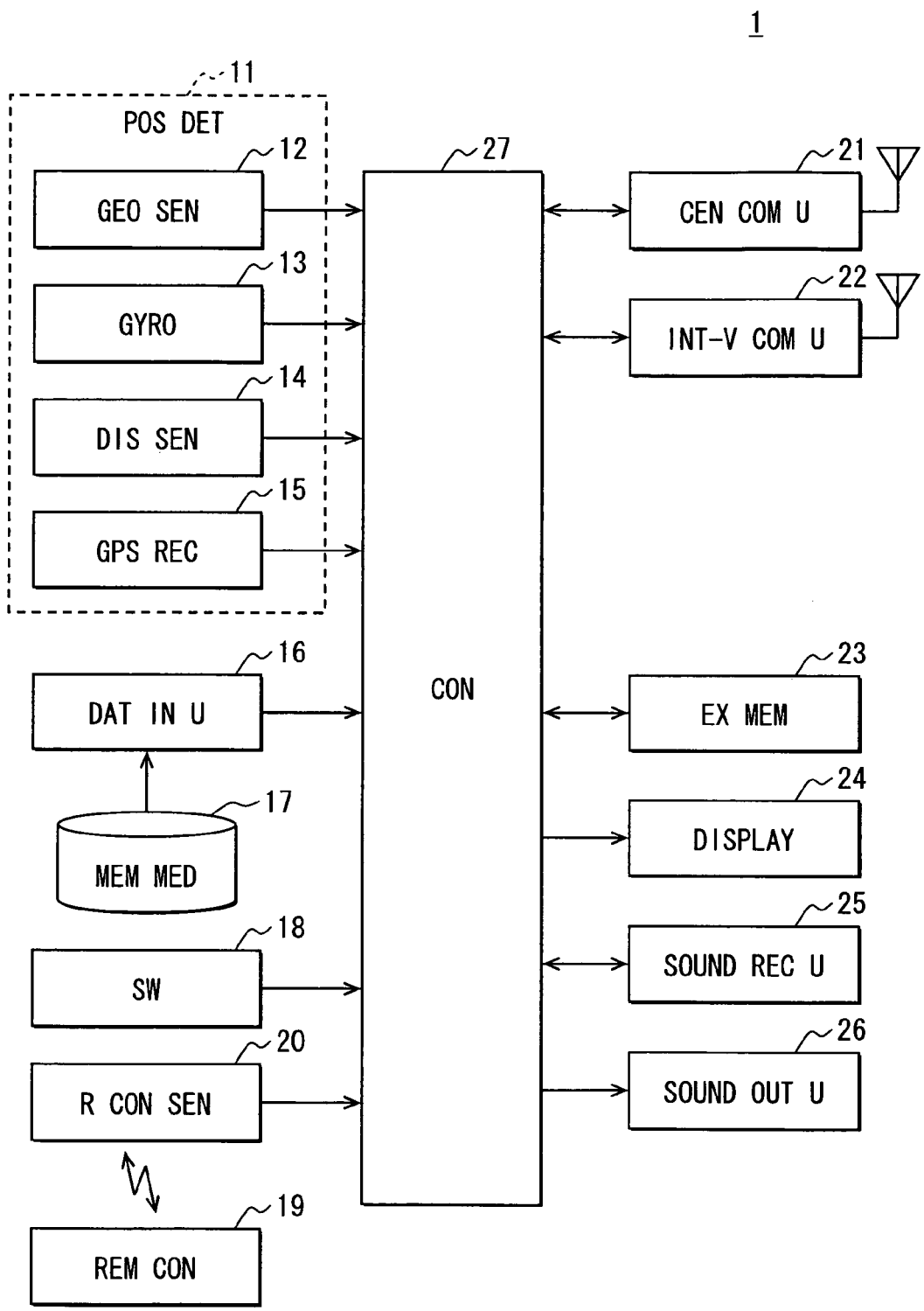
FIG. 2 is a block diagram showing a navigation apparatus in the system.

The navigation apparatus 1 is shown in FIG. 2. The navigation apparatus 1 includes a position detector 11, a map data input unit 16, a memory medium 17, a operation switches 18, a remote controller 19, a remote control sensor 20, a center communication unit 21, an inter-vehicle communication unit 22, an external memory 23, a display unit 24, a sound recognition unit 25, a sound output unit 26 and a controller 27, which is coupled with them.

The position detector 11 includes a conventional geomagnetic sensor 12, a gyroscope 13, a distance sensor 14, and a GPS receiver 15 for a GPS (grovel positioning system), which detects a current position of the vehicle based on an electric wave from a satellite. These sensors and elements 12-15 have different errors, which are defined by different types of characteristics. Thus, The sensors and elements 12-15 are complementary used to detect the current position. In some cases, the position detector 11 may include a part of the sensors and elements 12-15. Alternatively, the position detector 11 may include a rotation sensor for detecting a rotation of a steering wheel, a wheel, sensor for detecting a rotating wheel of the vehicle, and the like.

The map data input unit 16 is coupled with the memory medium 17. The unit 16 inputs various data including a map matching data, map data and a landmark data from the memory medium 17 into the apparatus 1. The map matching data is used for improving position detection accuracy. The map data includes link data and node data representing a road. A link is defined as a segment connecting between two nodes when each road on the map is divided by multiple nodes into segments. The node represents a point at which the road is crossed, branched or joined. Thus, the road is defined by links, which are connected to each other. The link data includes various information showing a link ID as a specific number of the link, a link length showing a length of the link, coordinates (i.e., latitude and longitude) of a start node, coordinates of an end node, a name of the road, a type of the road, a width of the road, the number of traffic lanes, existence of a right turn lane or a left turn lane, the number of right turn lane or the left turn lane, a speed limit of the road and the like.

The node data includes various data showing a node ID as a specific number of the node, coordinates of the node, a name of the node, a connection link ID representing the link ID of the link, which is connected to the node, a type of an intersection, and the like. Each node is defined by the node ID.

The map data can be updated in each mesh having predetermined dimensions as a unit for updating. Thus, the map data is updated partially in each mesh. The map data includes data representing a mesh ID as an identifier of the mesh. Thus, each mesh is defined by the mesh ID. The map data further includes data showing a version number in each mesh. Each mesh has a version number, which represents updating information when the map data in the mesh is updated. The version number is updated when the map data is updated. When the map data is revised, only the mesh, which is revised, is updated. Thus, the version number of one mesh may be different from the version number of another mesh.

In this embodiment, each mesh includes the version number, which is revised when the map data is updated. Alternatively, each mesh may include updating date information instead of the version number information. In this case, each mesh includes information showing a timing of update of the mesh.

The memory medium 17 stores data of a type, a name and an address of a facility on the map. The data is used for a destination setting step when the apparatus 1 searches a route. The memory medium 17 functions as a map data memory means. The memory medium 17 is a CD-ROM, a DVD-ROM, a HDD or the like.

The operation switches 18 include a touch switch and/or a mechanical switch, which are integrally formed with the display unit 24. When a user operates the switches 18, an operation instruction is input in the controller 27. The operation instruction is, for example, an instruction for changing a scale of the map displayed on the display unit 24, an instruction for selecting a menu, an instruction for setting a destination, an instruction for starting a route search, an instruction for starting route guidance, an instruction for correcting a current position, an instruction for changing a display image, an instruction for controlling a volume of sound, an instruction for setting a main area initially, and the like. The switches 18 include a switch for setting a starting point and a destination. When the user operates the switches 18, the user can set the starting point and the destination based on a preset point, a mane of a facility, a telephone number, an address and the like.

The remote controller 19 includes multiple operation switches (not shown). When the user operates the switches on the controller 19 so that various instructions are input into the controller 27 via the remote control sensor 20. Thus, the user can execute various operation of the controller 27, similar to the switches 18.

The center communication unit 21 communicates with the center 2 via the network so that the unit 21 obtains the latest map data transmitted from the enter 2. The center communication unit 21 may connect to the network via, for example, an in-vehicle communication module used for a Telematics communication method such as a DCM (data communication module) mounted on the vehicle. Alternatively, the unit 21 may connect to the network via a cell phone, which is coupled with the unit 21 with a Bluetooth (which is a registered trademark) communication method.

The inter-vehicle communication unit 22 transmits data to and receives data from another inter-vehicle communication unit 22 of a navigation apparatus 1 mounted on another vehicle with a wireless communication method. Thus, the unit 22 performs inter-vehicle communication. The unit 22 may transmit and receive data via a wireless communication method such as the Bluetooth communication method and a wireless LAN method.

The external memory 23 is a high-capacity memory device such as a HDD, which is rewritable. Thus, the external memory 23 stores a large amount of data and data, which is not deleted even when a power source turns off. Further, the memory 23 read out data, which is frequently used, from the map data input unit 16 for utilizing the data. The memory 23 may be a removable memory having a comparatively small capacity.

The display unit 24 displays a map screen for guiding a route of the vehicle, a destination selection screen and the like. The unit 24 can display a full color screen. The unit 24 may be a liquid crystal display, an organic EL display, a plasma display and the like.

The sound recognition unit 25 recognizes a sound input from a microphone (not shown). Then, the unit 25 outputs a control command signal corresponding to the recognized sound, i.e., recognized instruction. The controller 27 executes a process according to the control command signal. The sound output unit 26 includes a speaker, and outputs sound for guidance according to the instruction from the controller 27 when the navigation apparatus 1 guides a route.

The controller 27 is a conventional computer. The controller 27 includes a CPU, a ROM, a RAM, a I/O device, and a bus line, which connects them. The controller 27 executes a process of a navigation function and a map data updating process based on various information input from the position detector 11, the map data input unit 16, the operation switches 18, the remote control sensor 20, the center communication unit 21, the inter-vehicle communication unit 22, the external memory 23, and the sound recognition unit 25. The process of the navigation function is, for example, a process for changing a map scale, a process for selecting a menu screen, a process for setting a destination, a process for searching a route, a process for guiding the route, a process for correcting a current position, a process for changing a display screen, and a process for changing a sound volume. The map data updating process is, for example, a process for setting an initial main area, a process for adding a new main area, a process for updating inter-vehicle communication, a process for determining a latest data, a process for updating center communication, a process for eliminating periodically, a process for instructing elimination of the main area, a process for updating the main area, and a process for updating a map data.

For example, the controller 27 executes the process for setting the initial main area when an instruction for setting a main area is received by the controller 27 from a user of the apparatus 1 via the remote control sensor 20 with the remote controller 19, the operation switches 18, or the sound recognition unit 25 so that the main area is set according to an input instruction.

The main area is a specific area, which is specified by the user among multiple areas on the map. Thus, the operation switches 18, the remote controller 19, the remote control sensor 20, and the sound recognition unit 25 provide an input instruction receiver. The controller 27 functions as an area setting device. For example, the area may be one mesh as a unit of the map data. Alternatively, the area may be one unity including multiple meshes of the map data so that the area provides a city, a town, a village, a ward, a district and the like. Alternatively, the area may include multiple meshes of the map data, which correspond to an area within a predetermined range with a specific center. Each area is defined as an area number, which is an identifier for identifying the area. Accordingly, the memory medium 17 stores the map data with respect to each area. The memory medium 17 functions as a map, data memory device. When the area is defined by one mesh of the map data, the area number is a mesh number.

The controller 27 sets the main area such that the controller 27 writes the area number of the main area in a list of a rewritable memory such as a RAM in the controller 27. Here, the list for storing the area number of the main area is defined as a main area list.

The controller 27 further sets a standard area, which is disposed around the main area. The standard area around the main area corresponds to eight meshes, which surround the main area, when the area is composed of one mesh. When the area includes multiple meshes, the standard area around the main area corresponds to an adjacent area and/or areas surrounding the main area. The controller 27 sets the standard area such that that the controller 27 writes the area number of the standard area in a list of the rewritable memory such as a RAM in the controller 27. Here, the list for storing the area number of the standard area is defined as a standard area list. The standard area list may be fixed after the list has been set once. Alternatively, the list may be reset when another main area is added in an additional main area setting process.

In the present embodiment, the controller 27 sets automatically the standard area according to the setup of the main area. Alternatively, the controller 27 sets the standard area according to an input signal for setting the standard area when the apparatus receives the input signal from an user via the remote control sensor 20 with the remote controller 19 and/or the operation switches 18 or the sound recognition unit 25. Even in these cases, the standard area is one of areas around the main area.

The controller 27 compares the main area set in the controller 27 and a main area set in a controller 27 of another vehicle when the navigation apparatus 1 communicates with a navigation apparatus of the other vehicle via the inter-vehicle communication unit 22 by the inter-vehicle communication method. Here, the main area stored in the controller 27 of the vehicle is defined as a subject main area of a subject controller 27 in the subject vehicle, and the main area stored in the controller 27 of the other vehicle is defined as an object main area of an object controller 27 in the object vehicle. When the object main area includes an area, which is not included in the subject area, the subject controller 27 adds the area not included in the subject area as a new main area in the list of the subject main area. The area to be added is defined as a main area, which is not set in the subject controller 27. This process is defined as an additional main area setting process, which will be explained later.

In order to distinguish the main area set in the additional main area setting process from the main area set in the initial main area setting process, an identifier is attached with the information of the additional main area. Further, when the subject vehicle can communicate with multiple other vehicles by the inter-vehicle communication method, the subject vehicle preferentially obtains data from an object vehicle via the inter-vehicle communication unit 22 with the inter-vehicle communication method, the object vehicle providing the object main area, which is included in a subject standard area of the subject controller 27.

When the controller 27 compares the subject main area with the object main area, and the controller determines that the object main area includes a main area, which is not included in the subject main area, the subject controller 27 obtains the map data corresponding to the main area not included in the subject main area from the object controller 27 in the object vehicle via the inter-vehicle communication unit 22 by the inter-vehicle communication method. Then, the subject controller 27 executes an inter-vehicle communication updating process such that the map data corresponding to the area not included in the subject main area and stored in the memory medium 17 of the subject vehicle is updated, i.e., replaced with the map data of the main area transmitted from the object vehicle. The map data of the main area transmitted from the object vehicle includes the information about a vehicle number, which initially provides the map data of the main area. The updated map data includes the information of the vehicle number of an information source vehicle. The vehicle number may be an identifier for identifying an individual vehicle. The information source vehicle initially transmits the map data of the main area, so that a controller 27 in the information source vehicle sets the main area in the initial main area setting process.

The subject controller 27 compares the subject main area and the object main area, and the subject controller 27 determines that the subject main area includes a common main area, which is included in the object main area, the subject controller 27 executes a process for determining a latest data such that the subject controller 27 determines whether the map data of the common main area set in the subject controller 27 is newer or older than the map data of the common main area set in the object controller 27. The process for determining the latest data is defined as an old and new determination process. Then, the subject controller 27 executes a process according to determination result of the old and new determination process. The old and new determination process will be explained later.

The controller 27 communicates with the center 2 via the center communication unit 21 so that the controller 27 obtains the latest map data of the main area set in the initial main area setting process from the center 2. The controller 27 executes a center communication updating process such that the map data corresponding to the main area stored in the memory medium 17 is updated, i.e., replaced with the latest map data of the main area obtained from the center 2. The controller 27 may obtains the latest map data from the center 2 when the center 2 transmits information about map data change. Alternatively, the controller 27 may obtains the latest map data periodically, for example, in each week or each month.

The controller 27 executes a process for eliminating periodically such that the setup of the main area, which is set in the additional main area setting process, i.e., which is derived from other vehicles, is eliminated when a predetermined time has elapsed since the main area is set. Specifically, the controller 27 eliminates the setup of the main area such that the area number is eliminated from the main area list. The predetermined time may be settable, and, for example, may be one week or one month.

Figure 3:
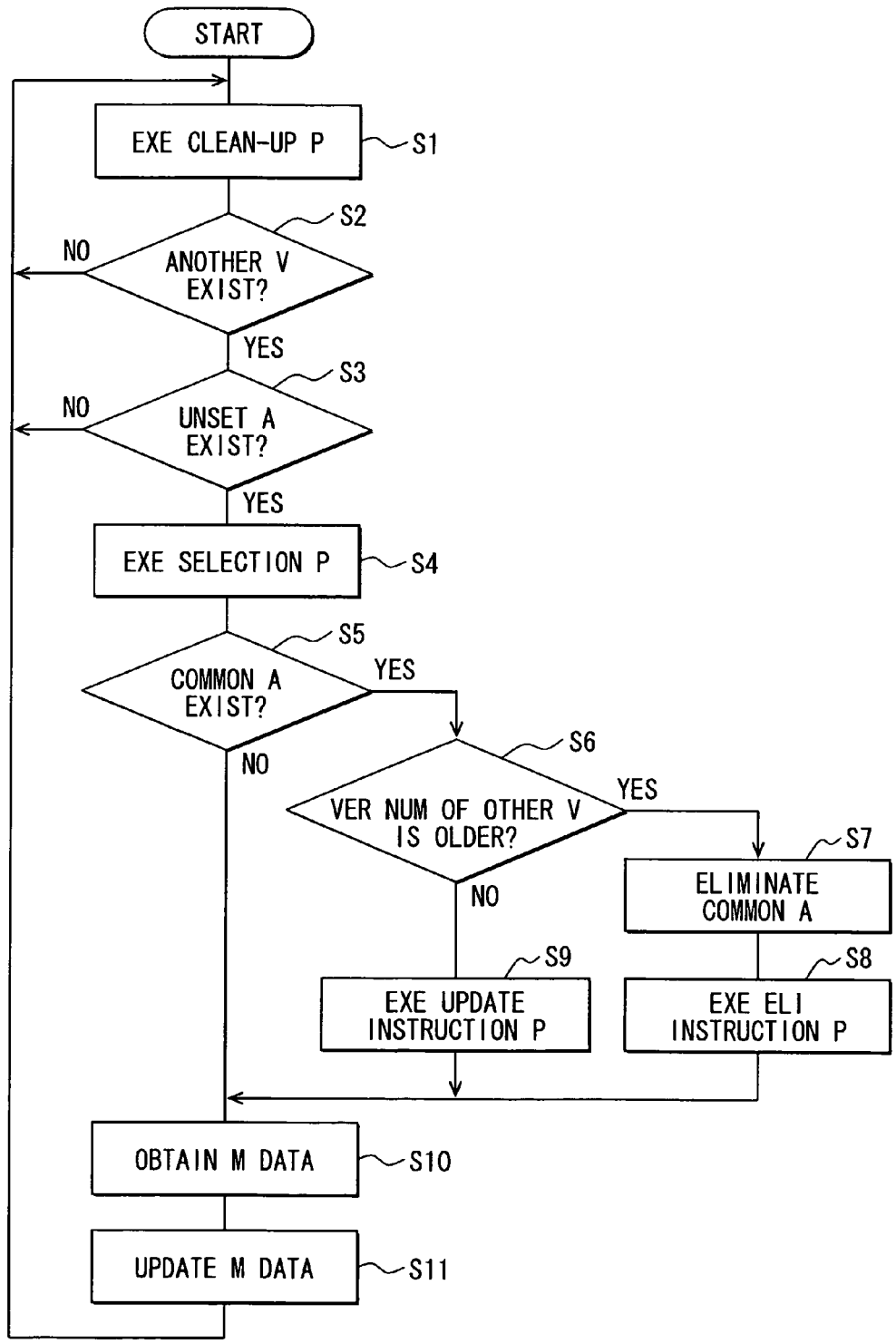
FIG. 3 is a flowchart showing a process for updating map data.

Next, a process for updating the map data in the navigation apparatus 1 will be explained with reference to FIG. 3. FIG. 3 is a flowchart showing a process for updating the map data. Here, the controller 27 may start to execute the process when an ignition switch of the vehicle turns on, and the electric power is supplied to the navigation apparatus 1.

In step S1, the controller 27 executes the process for eliminating periodically as a periodic clean-up process. Then, it goes to step S2. In step S2, the controller 27 tries to communicate with another controller mounted on another vehicle via the inter-vehicle communication unit 22, and the controller 27 determines whether another vehicle, with which the controller 27 can communicate by the inter-vehicle communication method, exists. Specifically, the controller 27 determines whether another vehicle capable of communicating with the vehicle is disposed around the vehicle. When the controller 27 determines that another vehicle for inter-vehicle communication exists, i.e., when the determination in step S2 is "YES," it goes to step S3. When the controller 27 determines that another vehicle for inter-vehicle communication does not exist, i.e., when the determination in step S2 is "NO," it returns to step S1, and then, the process is repeated.

In step S3, the controller 27 compares the subject main area provided in the subject controller of the subject vehicle with an object main area provided in an object controller of the object vehicle as another vehicle, and determines whether an object main area of the object controller 27, which is not set in the subject controller 27, exists. Specifically, the controller 27 determines whether an unset main area exists. When the controller 27 determines that the unset main area exists in the subject main area, i.e., when the determination in step S3 is "YES," it goes to step S4. When the controller 27 determines that the unset main area does not exist in the subject main area, i.e., when the determination in step S3 is "NO," it returns to step S1, and then step S1 is repeated.

In step S4, the controller 27 executes an updating area selection process, and then, it goes to step S5. In the updating area selection process, the subject controller 27 compares the subject standard area of the subject vehicle with the object main area of the object vehicle, with which the subject vehicle can communicate by the inter-vehicle communication. Then, the subject controller 27 selects the object vehicle among other vehicles, with which the subject controller 27 can communicate by the inter-vehicle communication, such that the object vehicle provides a part of the object main area included in the subject standard area, and the part of the object main area is the widest among those of the other vehicles. Then, the subject controller 27 determines the object main area of the object vehicle as an updating area. When there is only one vehicle around the subject vehicle, and the one vehicle can communicate with the subject vehicle, the subject controller 27 determines that the one vehicle is the object vehicle, and the object main area of the one vehicle is the updating main area. Then, it goes to step S5.

In step S5, the subject controller 27 determines whether a common main area exists between the subject main area and the updating main area. Further, the subject controller 27 determines whether the version number of the map data corresponding to the common main area in the subject controller 27 is different from that in the object controller 27. When the subject controller 27 determines that the common main area exists, and the version number in the subject controller 27 is different from that in the object controller 27, i.e., when the determination of step S5 is "YES," it goes to step S6. When the subject controller 27 does not determine that the common main area exists, and the version number in the subject controller 27 is different from that in the object controller 27, i.e.; when the determination of step S5 is "NO," it goes to step S10.

In step S6, the subject controller 27 determines whether the version number of the map data of the common main area in the object vehicle is older than that in the subject vehicle. Specifically, the subject controller 27 determines whether the version number of common main area in the object controller 27 is older than that in the subject controller. When the subject controller 27 determines that the version in the object controller 27 is older than that in the subject controller, i.e., when the determination in step S6 is "YES," the subject controller 27 determines that the map data of the common main area in the subject controller 27 is newly updated, compared with the map data of the common main area in the object controller 27, and then, it goes to step S7. When the subject, controller 27 determines that the version in the object controller 27 is not older than that in the subject controller, i.e., when the determination in step S6 is "NO," the subject controller 27 determines that the map data of the common main area in the subject controller 27 is not newly updated, compared with the map data of the common main area in the object controller 27, and then, it goes to step S9. Thus, the subject controller 27 functions as an old-new determination element.

In step S7, the controller 27 eliminates the common main area of the object vehicle from the updating main area, and then, it goes to step S8. In step S8, the controller 27 executes the process for instructing elimination of the main area, i.e., a main area elimination instruction process. Then, it goes to step S10. In the main area elimination instruction process, the subject controller 27 transmits the information about the area number of the common main area and the vehicle number to the object vehicle via the inter-vehicle communication unit 22 when the subject controller 27 determines that the version number of the common main area in the object vehicle is older than that of the subject vehicle, the vehicle number being attached to the map data of the common main area in the subject controller 27. Thus, the subject controller 27 transmits an instruction for eliminating the common main area from the object main area to the object controller 27 in the object vehicle. Thus, the subject controller 27 instructs main area elimination to the object vehicle.

Figure 4:
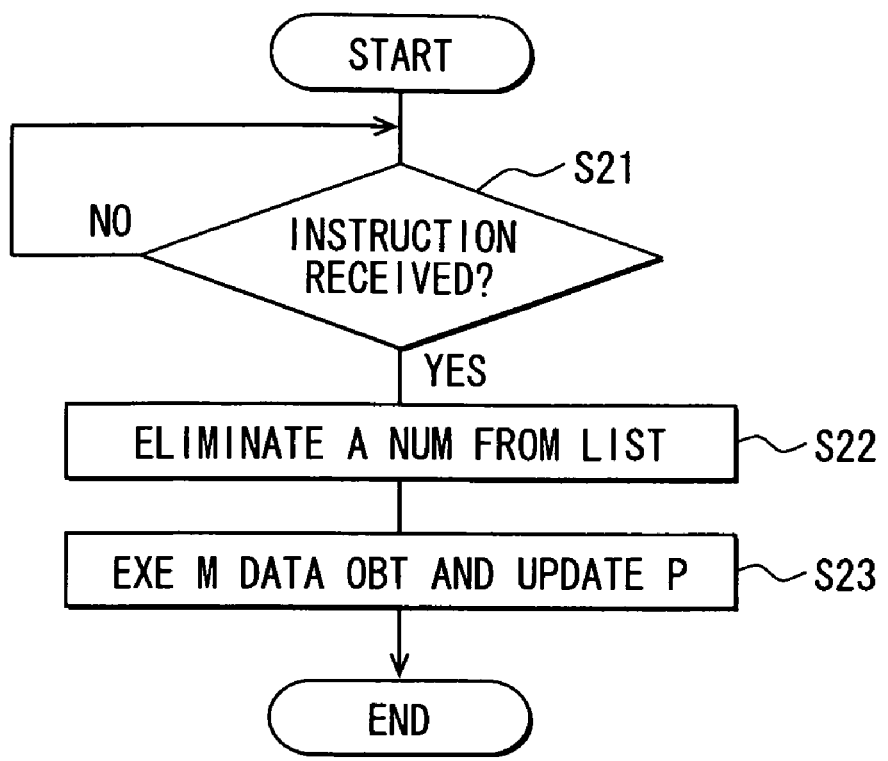
FIG. 4 is a flowchart showing a process in the navigation apparatus of a vehicle, which receives an instruction for excluding a main area.

Here, a process in a navigation apparatus 1 in the object vehicle, which receives the main area elimination instruction from the subject vehicle, will be explained with reference to FIG. 4. FIG. 4 shows a flowchart of the process in the navigation apparatus 1 in the object vehicle. Here, the object controller 27 may start to execute the process when an ignition switch of the object vehicle turns on, and the electric power is supplied to the navigation apparatus 1.

In step S21, the object controller 27 determines whether the object controller 27 receives the main area elimination instruction via the inter-vehicle communication unit 22. When the object controller 27 determines that the object controller 27 receives the instruction from the subject vehicle, i.e., when the determination in step S21 is "YES," it goes to step S22. When the object controller 27 does not determine that the object controller 27 receives the instruction from the subject vehicle, i.e., when the determination in step S21 is "NO," it returns to step S21, and step S21 is repeated.

In step S22, the object controller 27 eliminates the area number from the main area list according to the area number received by the object controller 27 via the inert-vehicle communication unit 22. Thus, the object controller 27 eliminates the main area corresponding to the area number transmitted from the subject vehicle among the main area, and then, it goes to step S23.

In step S23, the object controller 27 executes the process for updating the map data (i.e., the map data obtaining and updating process) according to the vehicle number, which is received from the subject vehicle via the inert-vehicle communication unit 22. In the map data obtaining and updating process, the object controller 27 communicates with a vehicle provided by the vehicle number via the inter-vehicle communication unit 22. Then, the object controller 27 transmits the area number received from the subject vehicle to the vehicle corresponding to the vehicle number. Thus, the object controller 27 obtains the map data of the main area corresponding to the area number from a navigation apparatus 1 of the vehicle provided by the vehicle number. By using the map data of the obtained main area, the object controller 27 updates the map data stored in the memory medium 17, and then, the process in FIG. 4 ends. When the object controller 27 cannot communicate with the vehicle shown in the vehicle number, which is received by the object controller 27 via the inter-vehicle communication unit 22 within a predetermined time interval, the object controller 27 may end the process in FIG. 4 without executing the map data obtaining and updating process.

In the present embodiment, the subject controller 27 transmits the information about the area number and the vehicle number and the main area elimination instruction to the object controller 27. Thus, the object controller 27 eliminates the main area corresponding to the area number from the main area set in the object controller 27. Further, the object controller 27 obtains the information about the main area corresponding to the area number from the vehicle shown in the vehicle number. According to the obtained map data of the main area, the object controller 27 updates the map data stored I the memory medium 17 in the object vehicle. Alternatively, the subject controller 27 may transmit the information about the area number, the map data of the main area corresponding to the area number stored in the apparatus 1 of the subject vehicle and the main area elimination instruction to the object vehicle. Thus, the object controller 27 eliminates the main area corresponding to the area number from the main area set in the object controller 27. Further, the object controller 27 may update the map data stored in the memory medium 17 of the object vehicle with using the map data of the main area corresponding to the area number and set in the apparatus 1 of the subject vehicle.

In FIG. 3, in step S9, the subject controller 27 executes the main area updating instruction process, i.e., the process for updating a map data in the object vehicle. Then, it goes to step S10. In the main area updating instruction process, the subject controller 27 transmits the area number of the common main area and the vehicle number attached to the map data of the main area corresponding to the common main area and set in the object controller 27 to the object controller 27 in the object vehicle provided by the vehicle number attached to the map data of the main area corresponding to the common main area. Specifically, the subject controller 27 transmits the area number of the common area and the vehicle number of the information source vehicle defined in step S23 to the object controller of the object vehicle. Further, the subject controller 27 transmits an instruction for eliminating the common main area from the main area set in the object controller 27 of the object vehicle. Here, the instruction is defined as a main area elimination instruction.

The object controller 27, which receives the area number, the vehicle number and the main area elimination instruction, eliminates the main area corresponding to the area number from the main area list according to the process in FIG. 4. Further, the object controller 27 obtains the map data of the main area corresponding to the area number from the information source vehicle corresponding to the vehicle number via the inter-vehicle communication method. The object controller 27 updates the map data stored in the memory medium 17 according to the obtained map data of the main area.

Then, in step S10, the subject controller 27 obtains the map data of the main area corresponding to the updating area from the object controller 27 via the inter-vehicle communication unit 22. Specifically, the subject controller 27 obtains the map data of the updating area. Then, it goes to step S11. In step S11, the subject controller 27 updates the map data stored in the memory medium 17 with using the map data of the main area, which is obtained in step S10. Further, the subject controller 27 sets the man area obtained in step S10 as a new main area, and then, it returns to step S1. When the map data stored in the memory medium 17 is updated with using the obtained map data of the main area, the version number and the vehicle number attached to the obtained map data of the main area are also attached to the new map data, which is to be stored in the memory medium 17.

The process in FIG. 3 ends, for example, when the ignition switch of the vehicle turns off so that power supply to the navigation apparatus 1 is stopped.

Figure 5:
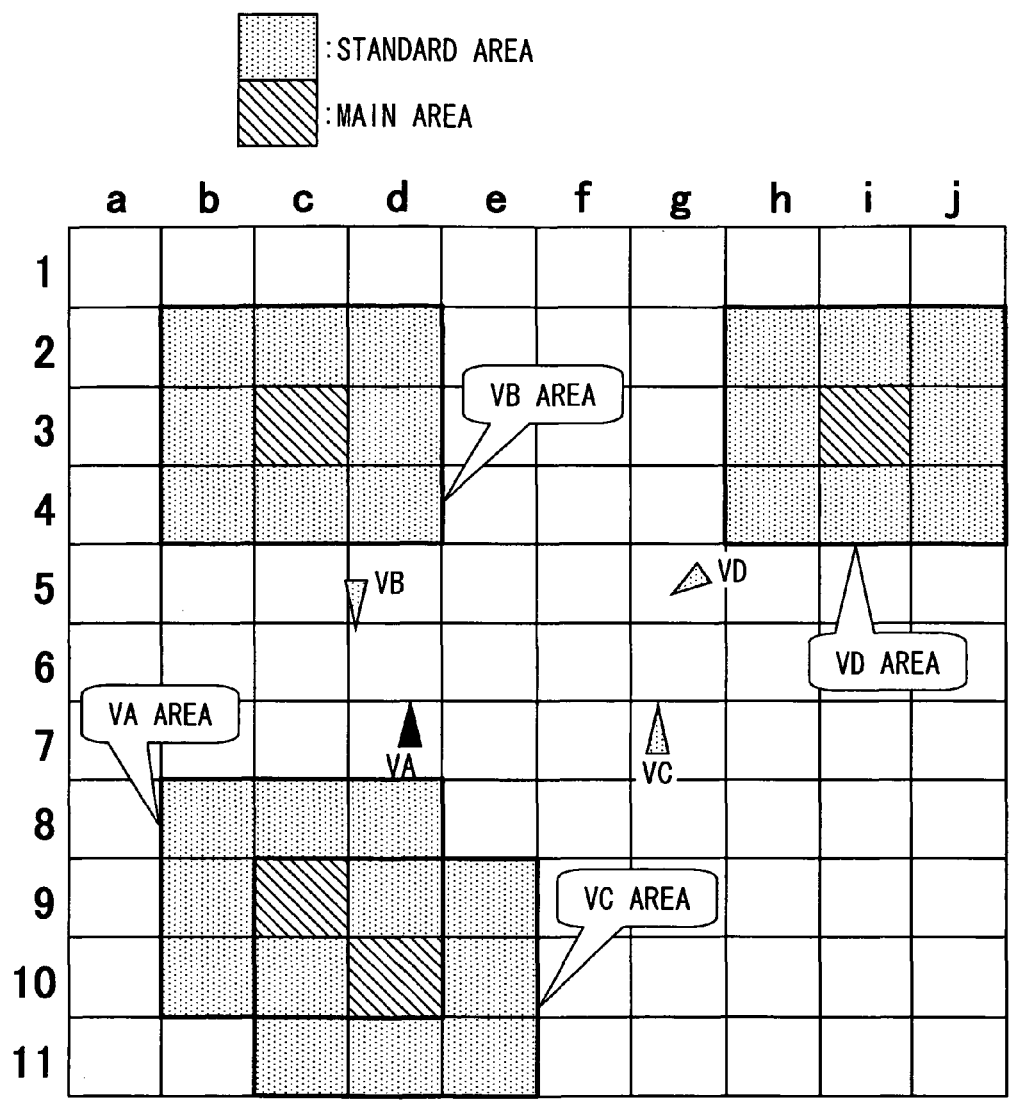
FIG. 5 is a diagram showing a main area and a standard area set in each vehicle.

An example for updating the map data in the map data updating system 100 will be explained with reference to FIG. 5. FIG. 5 shows four vehicles VA-VD having a main area and a standard area. Here, each area is defined by a mesh with a square. The region shown in FIG. 5 includes eleven lines 1-11 and eleven rows a-j. Each area is specified by coordinates of a line 1-11 and a row a-j. The vehicle VA can communicate with other vehicles VB-VD via inter-vehicle communication. Further, the vehicle VC can communicate with the vehicle VD via inter-vehicle communication.

First, the initial main area and the initial standard area of each vehicle VA-VD are shown. Here, in FIG. 5, an oblique line mesh represents the main area, and a hatching mesh represents the standard area. For example, the initial main area of the vehicle VA is defined as 9c, and the initial standard area of the vehicle VA surrounds the main area and is defined as 8b, 8c, 8d, 9d, 10d, 10c, 10b, and 9b. The initial main area of the vehicle VB is defined as 3c, and the initial standard area of the vehicle VB surrounds the main area and is defined as 2b, 2c, 2d, 3d, 4d, 4c, 4b, and 3b. The initial main area of the vehicle VC is defined as 10d, and the initial standard area of the vehicle VC surrounds the main area and is defined as 9c, 9d, 9e, 10e, 11e, 11d, 11c, and 10c. The initial main area of the vehicle VD is defined as 3i, and the initial standard area of the vehicle VD surrounds the main area and is defined as 2h, 2i, 2j, 3j, 4j, 4i, 4h and 3h. The current position of the vehicle VA is defined as 7d, the current position of the vehicle VB is defined as 5d, the current position of the vehicle VC is defined as 7g, and the current position of the vehicle VD is defined as 5g.

The vehicle VA, i.e., the controller 27 of the vehicle VA, determines that a communication partner for obtaining data via inter-vehicle communication is the controller 27 of the vehicle VC among the vehicles VB-VD since the controller 27 of the vehicle VC sets the main area 10d, which is included in the standard area 8b, 8c, 8d, 9d, 10d, 10c, 10b, and 9b of the controller 27 of the vehicle VA. Then, the controller 27 of the vehicle VA (hereinafter, the vehicle VA may represents the controller 27 of the vehicle VA) starts to communicate with the vehicle VC.

When the vehicle VA and the vehicle VC communicate with each other via inter-vehicle communication, the map data of the main area 9c in the controller 27 of the vehicle VA is transmitted to the vehicle VC, and the map data of the main area 10d in the controller 27 of the vehicle VC is transmitted to the vehicle VA. Thus, the data of the main area is exchanged. Then, the vehicle VA add the main area 10d into the main area in the controller 27 of the vehicle VA, i.e., the main area list, and the vehicle VA attaches the vehicle number of the vehicle VC to the map data of the main area 10d. The vehicle VC add the main area 9c into the main area in the controller 27 of the vehicle VC, i.e., the main area list, and the vehicle VC attaches the vehicle number of the vehicle VA to the map data of the main area 9c. Then, the vehicle VA stops to communicate with the vehicle VC via inter-vehicle communication.

Then, the vehicle VA receives information from the center 2 or the like that the map data of the main area 9c is updated. Further, the vehicle VC receives information from the center 2 or the like that the map data of the main area 10d is updated. The vehicle VA obtains the latest map data of the main area 9c from the center 2 according to the above information, and updates the map data of the main area 9c. The vehicle VC obtains the latest map data of the main area 10d from the center 2 according to the above information, and updates the map data of the main area 10d.

After the vehicles VA, VC end to update the map data, the vehicle VA determines that a communication party for obtaining data is the vehicle VB among the vehicles VB, VD, with which the vehicle VA does not have communicated, since the vehicle VB is closer to the vehicle VA than the vehicle VD. Specifically, the vehicle VA selects the vehicle VB among the vehicles VB, VD, from which the vehicle VA has not obtained data, and with which the vehicle VA can communicate, and then, the vehicle VA starts to communicate with the vehicle VB.

When the vehicle VA communicates with the vehicle VB via inter-vehicle communication, the map data of the main areas 9c, 10d in the controller 27 of the vehicle VA is transmitted to the vehicle VB, and the map data of the main area 3c in the controller 27 of the vehicle VB is transmitted to the vehicle VA. Thus, the data of the main area is exchanged. Then, the vehicle VA adds the main area 3c into the main area 9c, 10d in the controller 27 of the vehicle VA, i.e., the main area list, and the vehicle VA attaches the vehicle number of the vehicle VB to the map data of the main area 3c. The vehicle VB adds the main areas 9c, 10d into the main area 3c in the controller 27 of the vehicle VB, i.e., the main area list, and the vehicle VB attaches the vehicle number of the vehicle VA to the map data of the main area 9c. Further, the vehicle VB attaches the vehicle number of the vehicle VC to the map data of the main area 10d. Then, the vehicle VA stops to communicate with the vehicle VB via inter-vehicle communication.

Then, the vehicle VC communicates with the vehicle VD via inter-vehicle communication, so that the map data of the main areas 9c, 10d in the controller 27 of the vehicle VC is transmitted to the vehicle VD, and the map data of the main area 3i in the controller 27 of the vehicle VD is transmitted to the vehicle VC. Thus, the data of the main area is exchanged. Then, the vehicle VC adds the main area 3i into the main areas 9c, 10d in the controller 27 of the vehicle VC, i.e., the main area list, and the vehicle VC attaches the vehicle number of the vehicle VD to the map data of the main area 3i. The vehicle VD adds the main areas 9c, 10d into the main area 3i in the controller 27 of the vehicle VC; i.e., the main area list, and the vehicle VD attaches the vehicle number of the vehicle VA to the map data of the main area 9c. Further, the vehicle VD attaches the vehicle number of the vehicle VC to the map data of the main area 10d. Then, the vehicle VC stops to communicate with the vehicle VD via inter-vehicle communication.

Then, the vehicle VA determines that that a communication party for obtaining data is the vehicle VD, with which the vehicle VA does not have communicated. Specifically, the vehicle VA selects the vehicle VD, from which the vehicle VA has not obtained data, and with which the vehicle VA can communicate, and then, the vehicle VA starts to communicate with the vehicle VD.

The vehicle VA communicates with the vehicle VD via inter-vehicle communication, so that the map data of the main areas 3c, 9c, 10d in the controller 27 of the vehicle VA is transmitted to the vehicle VD, and the map data of the main areas 3i, 9c, 10d in the controller 27 of the vehicle VD is transmitted to the vehicle VA. Thus, the data of the main area is exchanged. However, the map data of the main area 9c set in the controller 27 of the vehicle VA has the version number, which is newer than the version number of the map data of the main area 9c set in the controller 27 of the vehicle VD since the map data of the main area 9c in the vehicle VA is updated with using the map data obtained from the center 2. Further, the version number of the map data of the main area 10d set in the controller 27 of the vehicle VD is newer than the version number of the map data of the main area 10d set in the controller 27 of the vehicle VA. Accordingly, the vehicle VA transmits the main area elimination instruction to the vehicle VD to eliminate the main area 9c from the list in the controller 27 of the vehicle VD. Further, the vehicle VA transmits the area number of the main area 9c and the vehicle number of the vehicle VA to the vehicle VD. Thus, the vehicle VD obtains the map data of the main area 9c from the vehicle VA, and updates the map data of the main area 9c, and adds the vehicle number of the vehicle VA to the obtained map data of the main area 9c. The vehicle VD transmits the main area elimination instruction to the vehicle VA to eliminate the main area 10d from the list in the controller 27 of the vehicle VA. Further, the vehicle VD transmits the area number of the main area 10d and the vehicle number of the vehicle VD to the vehicle VA. Thus, the vehicle VA obtains the map data of the main area 10d from the vehicle VD, and updates the map data of the main area 10d, and adds the vehicle number of the vehicle VC to the obtained map data of the main area 10d. Further, the vehicle VA adds the main area 3i into the main areas set in the controller 27 of the vehicle VA, and adds the vehicle number of the vehicle VD to the map data to the main area 3i. Then, the vehicle VA stops to communicate with the vehicle VD via inter-vehicle communication.

In the above example, even when the vehicle number (i.e., the vehicle number of the vehicle VC) obtained from the vehicle VD is the same as the vehicle number of the information source vehicle (i.e., the vehicle number of the vehicle VC) of the main area 10d set in the vehicle VA, the vehicle VA obtains the map data of the main area 10d from the vehicle VC, and then, updates the map data of the main area 10d. Alternatively, for example, when the vehicle number transmitted from another vehicle is the same as the vehicle number of the information source vehicle of the main area set in the controller 27, the controller 27 may not obtain the map data of the main area, and update the map data.

After all of the processes for updating the map data among the vehicles VA-VD end, the main area and the standard area of each vehicle VA-VD are described as follows. The final main area of the vehicle VA is defined by 3c, 3i, 9c, and 10d. The final standard area of the vehicle VA is the same as the initial standard area, i.e., defined by 8b, 8c, 8d, 9d, 10d, 10c, 10b, and 9b. The final main area of the vehicle VB is defined by 3c, 9c, and 10d. The final standard area of the vehicle VB is the same as the initial standard area, i.e., defined by 2b, 2c, 2d, 3d, 4d, 4c, 4b, and 3b. The final main area of the vehicle VC is defined by 3i, 9c, and 10d. The final standard area of the vehicle VC is the same as the initial standard area, i.e., defined by 9c, 9d, 9e, 10e, 11e, 11d, 11c, and 10c. The final main area of the vehicle VD is defined by 3c, 3i, 9c, and 10d. The final standard area of the vehicle VD is the same as the initial standard area, i.e., defined by 2h, 2i, 2j, 3j, 4j, 4i, 4h, and 3h.

Thus, only when the main area set in the other vehicle includes an area, which is not included in the main area set in the vehicle, the map data of the area is obtained from another vehicle via inter-vehicle communication, and the controller 27 updates the map data of the area stored in the memory medium 17. Thus, the map data obtained via inter-vehicle communication is limited to the map data of the main area set in other vehicles. Accordingly, the communication volume in the inter-vehicle communication is reduced. Thus, the communication load is reduced.

Further, when the main area set in the other vehicle includes an area, which is not included in the main area set in the vehicle, the controller 27 adds the main area in the other vehicle as a new main area into the main area set in the controller 27. Thus, whenever the map data of the area not included in the main area of the controller 27 is updated, the main area of the controller 27 increases. Thus, the map data of a wide area can be updated appropriately.

When the main area in the controller 27 includes the main area derived from another vehicle and set by another user, a range of the updated map data is not excessively limited to an individual tendency such as tendency of selection of a destination and tendency of a driving route. Thus, the map data of a large area is updated.

The map data of the main area, which is preliminary set in the controller 27 of the navigation apparatus 1 according to an input instruction received from the remote controller 19 via the remote control sensor 20, the operation switches 18 or the sound recognition unit 25, is surely updated with the latest map data since the controller 27 obtains the latest map data from the center 2 via the network and the controller 27 update the map data of the main area. Thus, a range of the map data, which is updated with the latest map data obtained from the center 2, is limited, and therefore, a communication cost for obtaining the latest map data is reduced, and the load of the center 2 for delivering the latest map data is reduced. Thus, the latest map data is effectively updated.

Thus, the map data is effectively updated with restricting excessive limitation of the range of the map data to be updated. Thus, the map data corresponding to a large area is effectively updated. For example, when the user parks the vehicle in a parking lot of a large shopping mall and an amusement park, at which many vehicles gather from many places, the controller 27 can update the map data of a large area without obtaining the data from the center 2. Thus, with reducing the load of the server in the center 2, the controller 27 updates the new map data of the large area. Here, the navigation apparatus functions as an in-vehicle device.

The main area may be limited in a range of a dairy living area of a user such as a city, a town, a village, a ward, a district and the like, in which a house of the user is disposed, a predetermined area with a center of the house of the user, i.e., a predetermined area around the house of the user, a city, a town, a village, a ward, a district and the like, in which an office of the user is disposed, and a predetermined area with a center of the office of the user, i.e., a predetermined area around the office of the user. The inter-vehicle communication party as the other vehicle or the object vehicle may be owned by an owner, who has a living area near the user's dairy living area. Specifically, probability of the owner having the living area near the user's living area is high in the above case. Thus, the map data of the area near the dairy living area of the user is effectively and intensively updated. The map data is valuable for the user. Thus, although the map data of a large area is effectively updated, the map data having high utility value for the user is intensively updated. Convenience for the user is improved.

In the above embodiment, the standard area around the main area is set. When the vehicle can communicate with multiple vehicles via the inter-vehicle communication unit 22, the controller 27 selects one of the vehicles, which provides many main areas overlapped with the standard area of the controller 27. Specifically, the controller 27 preferentially obtains the map data of the main area in the one of the vehicles, which provides the most main areas overlapped with the standard area of the controller 27. Then, the controller 27 executes a process after that.

In the above case, when the controller 27 can obtain the map data of the main area in multiple other controllers in multiple other vehicles via inter-vehicle communication, the controller 27 preferentially obtains the map data of the main area in one of the other vehicles, which is disposed around the main area of the controller 27, so that the controller 27 executes a process after that. Thus, the map data of the area around the main area in the controller 27 is effectively updated. For example, when the main area of the controller 27 is a dairy living area of the user, the map data of the area near the dairy living area of the user is effectively updated. Thus, the map data of the area, which is frequently used by the user, is effectively updated.

In the above embodiment, the main area derived from another vehicle in the main areas of the controller, 27 is preferably eliminated from the main area of the controller 27 when a predetermined time has elapsed since the main area derived from the other vehicle was set in the controller 27.

Thus, the main area derived from the other vehicle is not held in the controller 27 unless the main area from the other vehicle is frequently obtained from another vehicle and updated. Thus, a range of the main area of the controller 27 is not excessively widened. Thus, the communication traffic of the inter-vehicle communication is reduced, and the communication load is also reduced. Further, when the main area is the dairy living area of the user, probability that the map data of the main area frequently obtained from other vehicles is a map data of an area near the dairy living area of the user obtained from another vehicle with another user having a dairy living area near the living area of the user may be high. Thus, the range of the main area in the controller 27 does not excessively expand from an area near the dairy living area of the user. Thus, the communication traffic of the inter-vehicle communication is reduced, and the communication load is also reduced. Further, the map data of an area, which the user frequently utilizes, is intensively updated.

In the present embodiment, when the map data of the common main area of the controller 27 is newer than that of another controller 27, the controller 27 transmits the main area elimination instruction to the other vehicle so that the other controller 27 in the other vehicle eliminates the common main area from the main area in the other controller 27, and the other controller 27 updates the latest map data of the main area.

In the above case, when the controller 27 obtains the map data of the main area from another vehicle via inter-vehicle communication, and the map data is a old version, the controller 27 can instruct the other controller in the other vehicle to update the old map data of the main area with a newly updated map data. Thus, only the newly updated map data remains in the controller 27. Thus, probability that the old version map data is exchanged between the vehicles via inert-vehicle communication is reduced.

The above disclosure has the following aspects.

According to a first aspect of the present disclosure, an in-vehicle apparatus for updating a map data mounted on a vehicle includes: a memory for storing the map data, which is defined in each area; a center communication element for obtaining a latest map data from an external information center via a communication network; an inter-vehicle communication element for transmitting data to and receiving data from another in-vehicle apparatus mounted on another vehicle with an inter-vehicle communication method; an input element for receiving an input signal from an user, the input signal specifying a specific area; and a controller for setting the specific area as an initial main area. The inter-vehicle communication element receives another Map data corresponding to another main area set in another controller of another in-vehicle apparatus. The controller compares the map data corresponding to the initial main area with another map data. When the controller determines that another main area includes an area, which is not included in the initial main area, the controller adds the area as a new main area into the initial main area, and the controller updates the map data with another map data corresponding to the new main area. The controller updates the map data corresponding to the initial main area with the latest map data from the external information center.

In the above apparatus, only when another main area provided by another in-vehicle apparatus mounted on another vehicle includes an area, which is not included in the initial main area, the inter-vehicle communication element receives another map data corresponding to the new main area, and the controller updates the map data with another map data corresponding to the new main area. Thus, only another map data corresponding to another main area set in another in-vehicle apparatus is obtained via the inter-vehicle communication, and therefore, communication volume of the inter-vehicle communication is reduced, and communication load is also reduced.

Further, when another main area provided by another in-vehicle apparatus mounted on another vehicle includes an area, which is not included in the initial main area, the controller adds the area as a new main area into the initial main area. Thu, whenever the controller updates the map data with another map data corresponding to the new main area, the initial main area increases, and therefore, the map data corresponding to a wide area is updated.

Furthermore, since the new main area derived from another vehicle is initially set by another user, another map data corresponding to the new main area, which is to be updated, is not excessively limited to tendency of the user such as tendency of selection of a destination and tendency of a driving route. Thus, the map data of a large area is updated.

Further, since the controller updates the map data corresponding to the initial main area with the latest map data from the external information center, a range of the latest map data is limited to the initial main area, and therefore, a communication cost is reduced. Further, a load of the information center is reduced. Thus, the map data is effectively updated with widening a range of the map data to be updated appropriately, and the map data corresponding to a large area is effectively updated.

Alternatively, the initial main area may be a dairy living area of the user.

Alternatively, the controller may set an area around the initial main area as a standard area. When the inter-vehicle communication element can communicate with a plurality of other vehicles with the inter-vehicle communication method, the controller selects one of the plurality of other vehicles in such a manner that the one of the plurality of other vehicles provides another main area, which overlaps with the standard area set in the controller. The inter-vehicle communication element preferentially receives another map data corresponding to another main area provided by the one of the plurality of other vehicles. The controller compares the map data corresponding to the initial main area with another map data provided by the one of the plurality of other vehicles.

Alternatively, the controller may eliminate the new main area from the initial main area when a predetermined time has elapsed since the controller adds the new main area into the initial main area.

Alternatively, the memory may further store update information, which shows a date when the map data is updated. When the controller determines that another main area and the initial main area have a common main area, the controller determines whether the map data corresponding to the common main area in the initial main area is newly updated than another map data. When the controller determines that the map data corresponding to the common main area in the initial main area is newly updated than another map data, the inter-vehicle communication element transmits an instruction to another in-vehicle apparatus, the instruction for updating another map data corresponding to the common main area in another main area. When the controller determines that the map data corresponding to the common main area in the initial main area is not newly updated than another map data, the controller updates the map data corresponding to the common main area in the initial main area with another map data corresponding to the common main area in another main area.

According to a second aspect of the present disclosure, a map data updating system includes: an external information center for storing a latest map data; and a plurality of in-vehicle apparatuses, each of which is provided by the in-vehicle apparatus according to the first aspect of the present disclosure.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An in-vehicle terminal apparatus mounted on a subject vehicle comprising:
    a map data memory for storing a map data, which is defined in each area;
    a center communication element for obtaining a latest map data from a center having the latest map data via a communication network and for updating the map data stored in the map data memory;
    an inter-vehicle communication element for transmitting data to and receiving data from another vehicle via inter-vehicle communication;
    an input reception element for receiving an input signal from an user, the input signal specifying a specific area; and
    an area setting element for setting the specific area corresponding to the input signal received by the input reception element as an main area,
    wherein the inter-vehicle communication element receives another map data corresponding to another main area set in another area setting element of another in-vehicle terminal apparatus in the another vehicle via the inter-vehicle communication when the inter-vehicle communication element can communicate with the another vehicle other than a subject vehicle via the inter-vehicle communication,
    wherein the area setting element compares the map data corresponding to the main area set in the area setting element of the in-vehicle terminal apparatus in the subject vehicle with the another map data corresponding to the another main area set in the another area setting element of the another in-vehicle terminal apparatus in the another vehicle,
    wherein, when the area setting element determines that the another main area set in the another area setting element in the another vehicle includes an area, which is not included in the main area set in the area setting element in the subject vehicle, the area setting element adds the area of the another main area set in the another area setting element in the another vehicle as a new main area into the main area of the area setting element in the subject vehicle, and the center communication element updates the map data corresponding to the area in the map data stored in the map data memory with using the another map data of the another main area obtained from the another vehicle, and
    wherein the center communication element updates the map data stored in the map data memory with respect to the specific area set as the main area by the area setting element according to the input signal received by the input reception element.

2. The in-vehicle terminal apparatus according to claim 1, wherein the main area is a daily living area of the user.

3. The in-vehicle terminal apparatus according to claim 1, wherein the area setting element further sets an area around the main area as a standard area,
    wherein, when the inter-vehicle communication element can communicate with a plurality of other vehicles via the inter-vehicle communication, the inter-vehicle communication element preferentially receives one map data corresponding to one main area provided by one of a plurality of other map data of other main areas set in other area setting elements of other in-vehicle terminal apparatuses in other vehicles, the one main area overlapping with the standard area set in the area setting element of the subject vehicle, and
    wherein the area setting element compares the map data corresponding to the main area set in the area setting element of the subject vehicle with the one map data corresponding to the one main area set in one area setting element of one of other vehicles.

4. The in-vehicle terminal apparatus according to claim 1, wherein the area setting element eliminates the new main area from the main area set in the area setting element when a predetermined time has elapsed, the new main area derived from the another vehicle.

5. The in-vehicle terminal apparatus according to claim 1, wherein the map data further includes update information, which shows a date when the map data is updated, the apparatus further comprising:
an update determination element,
wherein the update determination element compares the map data corresponding to the main area set in the area setting element of the in-vehicle terminal apparatus in the subject vehicle with the another map data corresponding to the another main area set in the another area setting element of the another in-vehicle terminal apparatus in the another vehicle,
wherein, when the update determination element determines that the another main area set in the another area setting element of the another vehicle and the main area set in the area setting element of the subject vehicle have a common main area, the update determination element determines whether the map data corresponding to the common main area in the main area set in the area setting element of the subject vehicle is newly updated than the another map data corresponding to the common main area in the another main area set in the another area setting element of the another vehicle,
wherein, when the update determination element determines that the map data corresponding to the common main area in the main area set in the area setting element of the subject vehicle is newly updated than the another map data corresponding to the common main area in the another main area set in the another area setting element of the another vehicle, the inter-vehicle communication element transmits an instruction to the another in-vehicle apparatus of the another vehicle with the inter-vehicle communication, the instruction for updating the another map data corresponding to the common main area in the another main area set in the another area setting element of the another vehicle, and
wherein, when the update determination element determines that the map data corresponding to the common main area in the main area set in the area setting element of the subject vehicle is not newly updated than the another map data corresponding to the common main area in the another main area set in the another area setting element of the another vehicle, the update determination element updates the map data corresponding to the common main area in the main area stored in the map data memory with the another map data corresponding to the common main area in the another main area obtained from the another vehicle.

6. A map data updating system, the system comprising:
a center for storing a latest map data; and
a plurality of in vehicle terminal apparatuses, each of the in-vehicle terminal apparatuses being adapted to be mounted on a subject vehicle, each in-vehicle terminal apparatus includes:
a map data memory for storing a map data, which is defined in each area
a center communication element for Obtaining the latest map data from the center having the latest map data via a communication network and for updating the map data stored in the map data memory;
an inter-vehicle communication element for transmitting data to and receiving data from another vehicle via inter-vehicle communication:
an input reception element for receiving an input signal from an user, the input signal specifying a specific area; and
an area setting element for setting the specific area corresponding to the input signal received by the input reception element as an main area,
wherein the inter-vehicle communication element receives another map data corresponding to another main area set in another area setting element of another in-vehicle terminal apparatus in the another vehicle via the inter-vehicle communication when the inter-vehicle communication element can communicate with the another vehicle other than the subject vehicle via the inter-vehicle communication,
wherein the area setting element compares the map data corresponding to the main area set in the area setting element of the in-vehicle terminal apparatus in the subject vehicle with the another map data corresponding to the another main area set in the another area setting element of the another in-vehicle terminal apparatus in the another vehicle,
wherein, when the area setting element determines that the another main area set in the another area setting element in the another vehicle includes an area, which is not included in the main area set in the area setting element in the subject vehicle, the area setting element adds the area of the another main area set in the another area setting element in the another vehicle as a new main area into the main area of the area setting element in the subject vehicle, and the center communication element updates the map data corresponding to the area in the map data stored in the map data memory with using the another map data of the another main area obtained from the another vehicle, and
wherein the center communication element updates the map data stored in the map data. memory with respect to the specific area set as the main area by the area setting element according to the input signal received by the input reception element.

\* \* \* \* \*